Aug. 19, 1958    W. MEIER ET AL    2,848,400
METHOD FOR THE CURDLING OF MILK
Filed Dec. 27, 1956

United States Patent Office 2,848,400
Patented Aug. 19, 1958

2,848,400

METHOD FOR THE CURDLING OF MILK

Walter Meier, Ammenhausen, and Peter Zublin, Glarisegg, near Steckborn, Switzerland Application December 27, 1956, Serial No. 630,837

Claims priority, application Switzerland December 28, 1955

2 Claims. (Cl. 204—137)

This invention relates to the processing of cheese.

In the manufacture of cheese, it has been common practice until quite recently to use copper kettles in which the milk was curdled and from which the curd and the whey could be taken.

The use of copper kettles has the disadvantage that both the curd and the whey pick up traces of copper. These traces of copper are particularly troublesome when the whey is processed into butter, since the butter so made becomes fishy in taste and cannot be sold as a first quality product.

Therefore, attempts have been made to replace copper kettles by kettles made from stainless steel. In these kettles, however, the curd tends to adhere to the walls of the kettle for some hitherto unknown reason, which of course is undesirable for the further processing of the curd. Tests have shown that this adhering of the curd can be avoided by suddenly cooling the wall of the kettle while the curd is forming. This sudden cooling or quenching of the wall however must be effected at the proper moment; otherwise the desired effect will not be obtained. Furthermore, this quenching produces differences of temperature in the curd so that the curdling in the zone near the cooled kettle wall is delayed and so-called "dust" is formed. Thereby, the quantity of the cheese is reduced and its quality is impaired.

A primary object of the invention is to provide a method permitting the use of stainless steel kettles for making cheese without encountering the detrimental effects mentioned above.

This improved method of curdling milk in a metallic container for the production of cheese and the like essentially consists of setting up, in the milk, an electric direct-current field in which the container serves as the negative electrode, or cathode.

This method makes use of the fact that the rennet curdling process is hindered by alkaline reactions and that such a reaction takes place in the vicinity of the cathode in a direct-current field.

Therefore, the generation of a direct-current field, using the wall of the kettle as the cathode, hinders the curdling of the milk in the vicinity of the wall so that the curd will not adhere to the wall.

Figure 2:
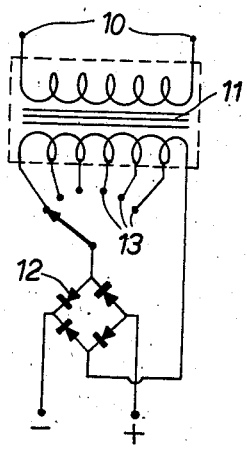
Figure 1:
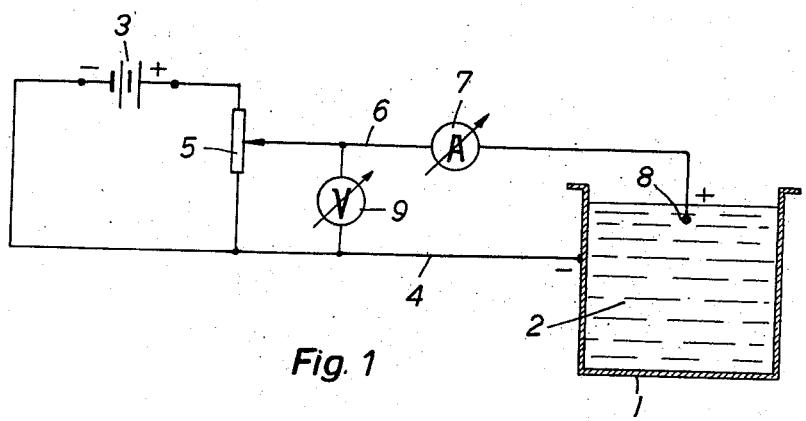

There will next be described, by way of example only, apparatus for effecting the method of the invention, reference being made to the accompanying drawing in which:

Fig. 1 schematically represents the apparatus with a kettle being shown in vertical section, and Fig. 2 schematically indicates an alternative to part of the electric circuit of Fig. 1.

The drawing also will be referred to in describing, by way of example, a method according to the invention by the use of the apparatus.

In Fig. 1 of the drawing, the reference numeral 1 indicates a stainless steel kettle for making cheese, the kettle being filled with milk 2 of a suitable quality. The wall of the kettle 1 is connected to the negative terminal of a battery 3 by means of an electric conductor 4. The positive terminal of the battery is connected to one end of a voltage divider resistor 5, the opposite end of which is connected to the conductor 4. By means of a conductor 6 and through an ammeter 7, the adjustable tap of the voltage divider 5 is connected to a silver anode 8 immersed in the milk 2. A voltmeter 9 is connected between the conductors 4 and 6.

As soon as rennet has been added to the milk 2, the anode 8 is lowered into the milk so that a direct-current field is set up within the kettle between the anode 8 and the kettle wall. If the milk charge in the kettle is 800 litres, a voltage of about 4 volts and a current of about 1 ampere are required. This voltage can be regulated by means of the voltage divider and the voltmeter. The alkaline effect which takes place near the cathode, that is, near the wall of the kettle, counteracts the excessive acidizing effect of the stainless steel so that an adhering of the curd to the kettle wall due to excessive acidity of the curd is prevented. The apparatus is maintained in operation until curdling of the milk has been completed and the kettle contents are ready for stirring. It is important that the milk be uniformly curdled nearly up to the wall, since this is advantageous both for the quantity and for the quality of the cheese.

Bacteriological tests have shown that the electric current has no detrimental effects. On the other hand, it is possible to improve the bacteriological action by a proper choice of the anode material.

As shown in Fig. 2, the apparatus can be fed from an alternating current supply 10 by means of a transformer 11 and rectifiers 12 instead of a battery. For adjusting the voltage between the anode and the kettle, the transformer 11 may be equipped with several taps 13 on its secondary windings, and/or a voltage divider resistor 5 may be provided and operated as shown in Fig. 1. The parts indicated in Fig. 2 take the place of the battery 3 in Fig. 1, and the remainder of the apparatus may be as shown in the latter.

Instead of a silver anode, an anode made from carbon or from other suitable material can be used.

The described method permits the use not only of kettles made from stainless steel, but also kettles made from other and cheaper materials since the electric field prevents corrosion due to the influence of the lactic acid.

What is claimed is:

1. In the curdling of milk for the production of cheese in a container made from stainless steel, the method of preventing the curd from adhering to the wall of said container which comprises applying to the said container a negative electric potential with reference to the electric potential of said milk.

2. In the curdling of milk for the production of cheese in a container made from stainless steel, the method of preventing the curd from adhering to the wall of said container which comprises immersing an electrode into said milk and applying to said electrode a positive electric potential with reference to the electric potential of said container.

References Cited in the file of this patent

UNITED STATES PATENTS

| | | |
|---|---|---|
| 829,308 | Willson | Aug. 21, 1906 |
| 1,046,766 | Frederiksen | Dec. 10, 1912 |
| 2,435,973 | MacTaggart et al. | Feb. 17, 1948 |

FOREIGN PATENTS

| | | |
|---|---|---|
| 2,229 | Great Britain | May 2, 1883 |